United States Patent
Kessler

(10) Patent No.: US 7,893,839 B2
(45) Date of Patent: *Feb. 22, 2011

(54) DEACTIVATABLE RFID LABELS AND TAGS AND METHODS OF MAKING SAME

(75) Inventor: John R. Kessler, Dayton, OH (US)

(73) Assignee: Avery Dennison Corporation, Pasadena, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/062,737

(22) Filed: Apr. 4, 2008

(65) Prior Publication Data

US 2008/0180251 A1 Jul. 31, 2008

Related U.S. Application Data

(62) Division of application No. 11/286,863, filed on Nov. 23, 2005, now Pat. No. 7,375,635.

(51) Int. Cl.
G08B 13/14 (2006.01)
(52) U.S. Cl. ............. 340/572.3; 340/10.42; 340/825.49
(58) Field of Classification Search .............. 340/572.3, 340/572.1–572.2, 572.4–572.9, 10.42, 825.49
See application file for complete search history.

(56) References Cited

U.S. PATENT DOCUMENTS

| | | | |
|---|---|---|---|
| 4,846,922 A | 7/1989 | Benge et al. | |
| 4,910,499 A * | 3/1990 | Benge et al. | 340/572.3 |
| 5,574,431 A | 11/1996 | McKeown et al. | |
| 5,884,425 A | 3/1999 | Baldwin | |
| 6,050,622 A | 4/2000 | Gustafson | |
| 6,724,307 B1 | 4/2004 | Siegel | |
| 6,911,911 B2 | 6/2005 | Surkau et al. | |
| 7,049,962 B2 | 5/2006 | Atherton et al. | |
| 7,098,794 B2 | 8/2006 | Lindsay et al. | |
| 7,116,223 B2 | 10/2006 | Stern et al. | |
| 7,212,127 B2 | 5/2007 | Jacober et al. | |
| 7,253,734 B2 | 8/2007 | Moskowitz | |
| 7,277,016 B2 * | 10/2007 | Moskowitz et al. | 340/572.3 |
| 7,323,995 B2 * | 1/2008 | Halope et al. | 340/572.7 |
| 7,327,261 B2 * | 2/2008 | Weslake et al. | 340/572.1 |
| 2003/0141962 A1 * | 7/2003 | Barink | 340/10.42 |

(Continued)

FOREIGN PATENT DOCUMENTS

JP 1153656 2/1999

OTHER PUBLICATIONS

Guenter Karjoth and Paul Moskowitz, Disabling RFID Tags with Visible Confirmation: Clipped Tags Are Silenced; WPES'05; Nov. 7, 2005; Alexandria, Virginia, USA; Copyright 2005 ACM 1-59593-228-3/05/0011.

(Continued)

*Primary Examiner*—Daniel Previl

(57) ABSTRACT

Disclosed are deactivatable RFID labels and tags in individual and web form, and methods of making same. When it is desired to deactivate the label or tag, the tag or label is subjected to tearing. One arrangement involves providing the label or tag with a tear strip by which the RFID transponder in the label or tag is destroyed, and in another arrangement a tag can be torn along a weakening line to destroy the RFID transponder.

6 Claims, 6 Drawing Sheets

U.S. PATENT DOCUMENTS

2005/0275540 A1 12/2005 Halope et al.
2006/0061475 A1 3/2006 Moskowitz et al.
2007/0024445 A1 2/2007 Weslake et al.
2007/0035383 A1 2/2007 Roemerman et al.

OTHER PUBLICATIONS

Guenter Karjoth and Paul Moskowitz, IBM Reserch Report; Disabling RFID Tags with Visible Confirmation: Clipped Tags Are Silenced; RC23710 (W0508-164) Aug. 31, 2005; Computer Science.

* cited by examiner

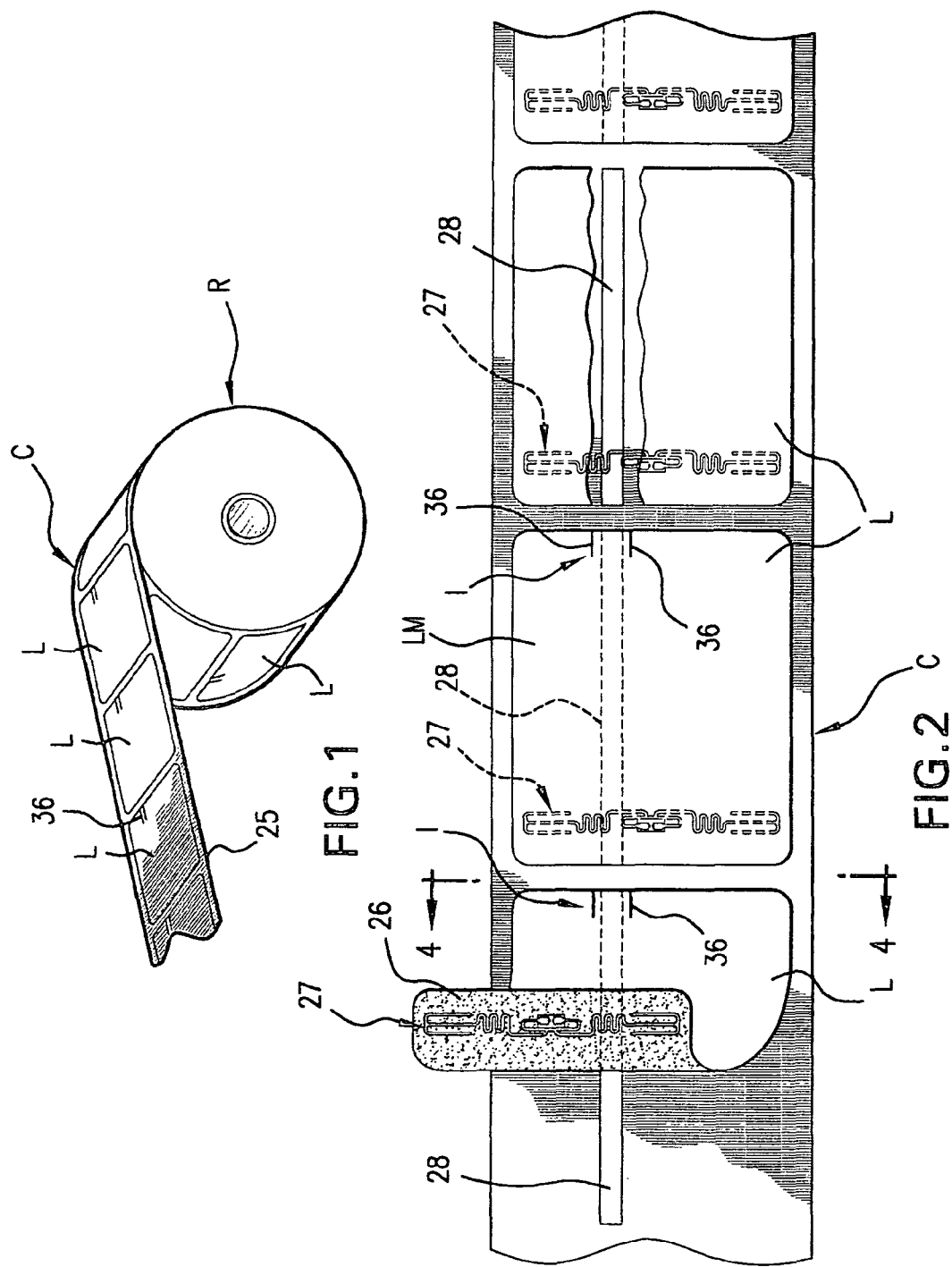

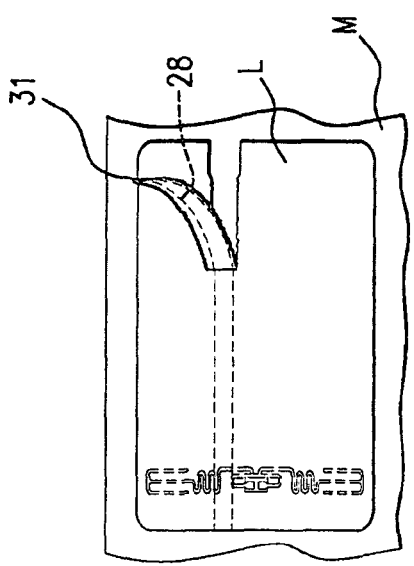
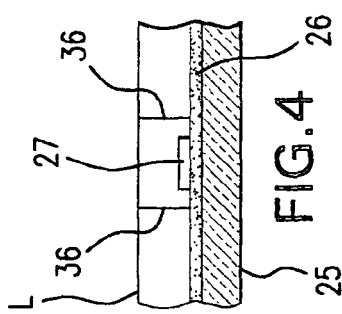
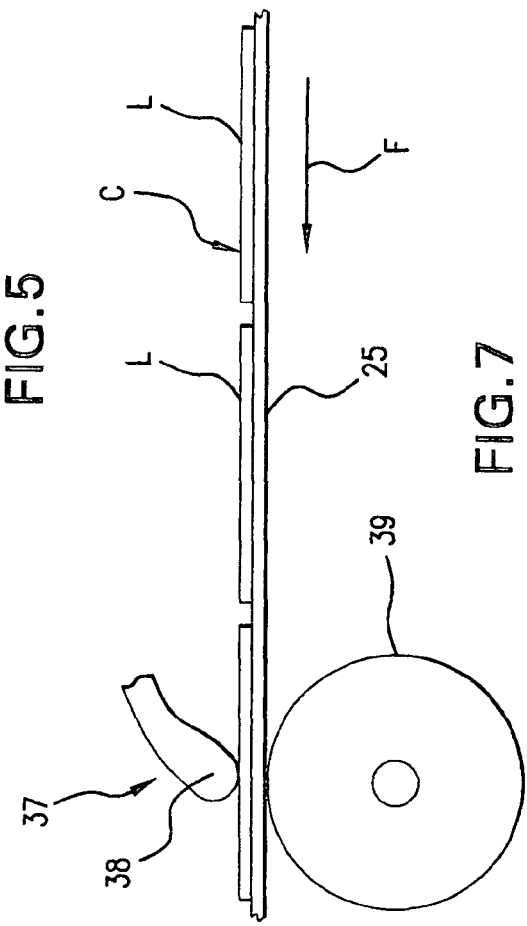
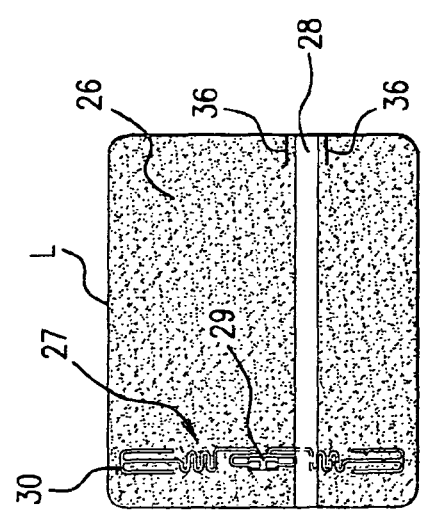
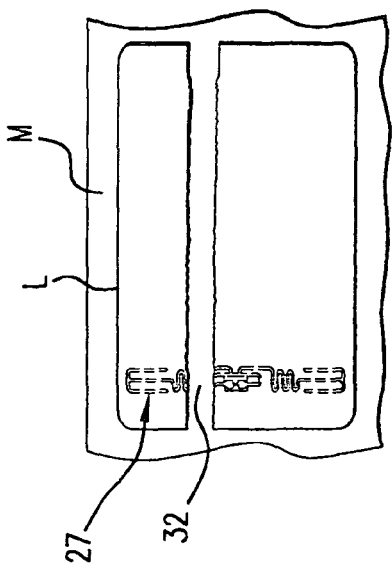

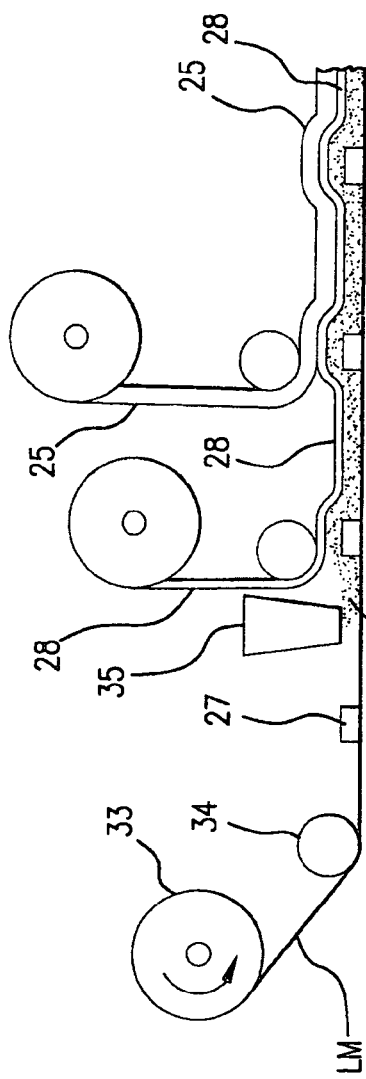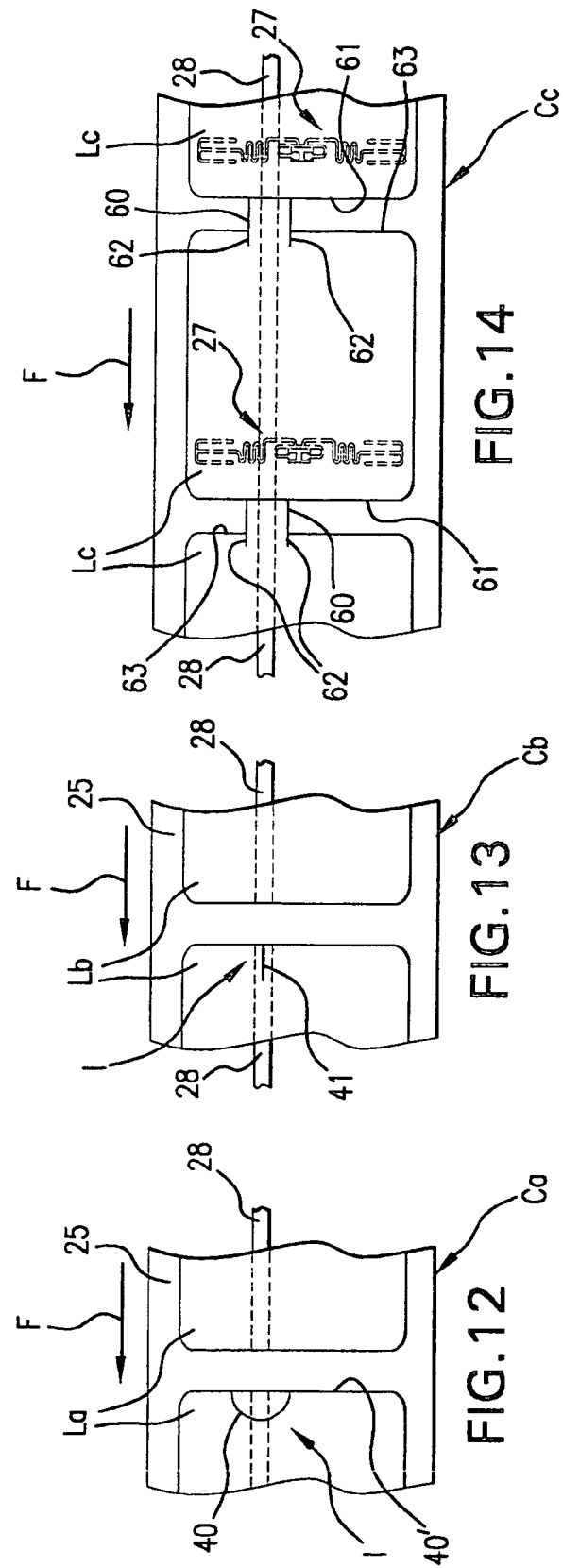

US 7,893,839 B2

DEACTIVATABLE RFID LABELS AND TAGS AND METHODS OF MAKING SAME

BACKGROUND OF THE INVENTION

1. Field of the Invention

The invention relates to RFID labels and tags, to webs of RFID labels and tags, and to methods of making them.

2. Brief Description of the Prior Art

A radio frequency identification (RFID) transponder includes an integrated circuit chip that can be written to and/or read from and an antenna coupled to the chip. It is known to provide RFID transponders in tags and labels.

SUMMARY OF THE INVENTION

It may be desired to deactivate the RFID transponder in the label or tag permanently to protect information in the chip from being read. Once an RFID label is adhesively adhered to a surface of a product or merchandise, it may be difficult and/or time-consuming to scrape the label from the surface or to cut through the label with a blade or a pair of scissors in order to deactivate it or to prevent damage to the product or merchandise. In addition, it depends on the availability of a blade such as a knife blade or a pair of scissors. Even though one attempts to destroy a circuit of an RFID transponder hidden beneath a label, the transponder may be difficult to locate, and a cut or scrape may not permanently destroy the RFID transponder. Similarly, an RFID transponder hidden in a tag may be difficult to locate or to cut or tear the tag so as to assuredly deactivate the tag permanently.

In accordance with the invention, there is provided improved deactivatable labels or tags or webs of labels or tags wherein a tear strip is used to destroy an RFID transponder on the label or tag. In a specific embodiment of an RFID label, a liner has a release coating, a label having pressure sensitive is releasably adhered to the release coating, an RFID transponder adheres to the adhesive, and a tear strip crosses the RFID transponder, and the tear strip is positioned between the liner and the transponder. In a linerless label, there is no liner, however, the printable face of the label is coated with a release coating. In a specific embodiment of a deactivatable tag, the tag is comprised of a pair of sheets of tag stock laminated to each other to form a tag. An RFID transponder is positioned between the sheets of tag stock, and a tear strip disposed between the sheets crosses the transponder. In another embodiment of a deactivatable RFID tag, a transponder is disposed between a laminated pair of sheets of tag stock, and a line of weakening extends to, but does not cut through or damage the transponder.

BRIEF DESCRIPTION OF THE DIAGRAMMATIC DRAWINGS

FIG. 1 is a perspective view of a roll of deactivatable RFID labels;

FIG. 2 is a top plan view of a web of RFID labels also shown in FIG. 1;

FIG. 3 is a bottom plan view of the label and tear strip shown in FIGS. 1 and 2;

FIG. 4 is a fragmentary sectional view taken along line 4-4 of FIG. 2;

FIG. 5 is a top plan view of the RFID label shown in FIGS. 1 through 4 applied to a surface of a product such as merchandise, showing the tear strip partially torn through the remainder of the label;

FIG. 6 is a top plan view similar to FIG. 5 but showing the tear strip as having torn through the transponder;

FIG. 7 is a diagrammatic view showing the labels being printed in a printer;

FIG. 11 is a diagrammatic view depicting the progression of steps shown in FIG. 10;

FIG. 12 is a fragmentary top plan view of a label web with a means to facilitate grasping the tear strip;

FIG. 13 is a view similar to FIG. 12 showing an alternative means to facilitate grasping the tear strip;

FIG. 14 is a view similar to FIGS. 12 and 13, but showing yet another means to facilitate grasping the tear strip;

DETAILED DESCRIPTION OF THE PREFERRED EMBODIMENTS

Figure 8:
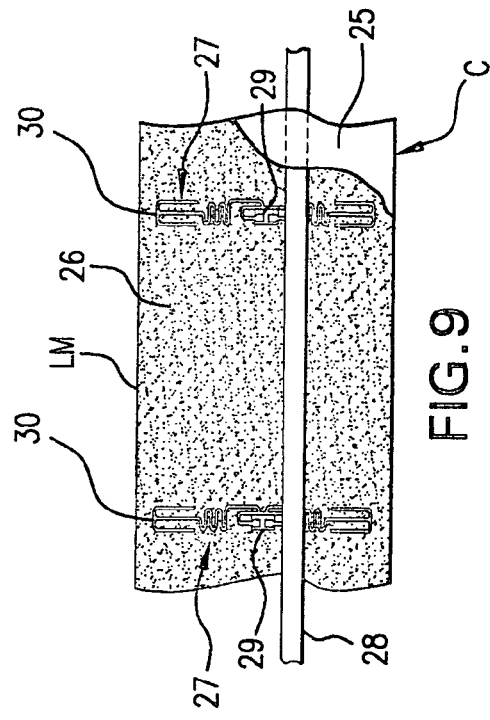
FIG. 8 is a top plan view of a label material web to which transponders have been applied at spaced apart intervals.

With reference to FIG. 1, there is shown a roll R of a composite web C of deactivatable RFID labels L. The labels L are releasably adhered to a carrier web or liner 25, frequently referred to as a release liner, coated with a release coating such as a wax or silicone. The labels L are releasably adhered to the release coating on the carrier web 25 by pressure sensitive adhesive 26 as best shown in FIG. 2. The undersides of the labels L have RFID transponders 27. The adhesive 26 is applied to the undersides of the labels L and to the transponders 27, and the transponders are preferably between the labels L and the adhesive 26.

During manufacture, a continuous web of a tear strip 28 is applied to the adhesive 26 across the transponders 27. The web of tear strip 28 adheres readily to the adhesive 26 which holds the tear strip web 28 in place. The liner 25 is laminated to the adhesive 26 beneath the label material LM which comprises the labels L. The label material LM is then cut into labels L as by fully die cutting to form the labels L as shown in FIGS. 1 and 2. It is noted that the tear strip web material between labels is also removed as the matrix or waste label material is stripped away from around the labels L. As best shown in FIG. 2, the transponder 27 comprises an RFID chip 29 and an antenna 30. The tear strip 28 is shown to cross the antenna 30 and is offset from the chip 29 as is preferred, however, the tear strip 28 can be aligned with the chip 29, if desired.

FIG. 5 shows the label L applied to the surface of packaging or a product referred to herein as merchandise M. The tear strip 28 is shown as having torn a strip 31 of the label L from the remainder of the label L. If tearing were to continue the tear strip would tear out part of the antenna 30, thereby deactivating the transponder 27. The tear strip 28 is underneath the transponder 27 so that pulling on the tear strip 28 tears through the transponder 27, and preferably the tear strip 28 tears through the antenna 27. FIG. 6 shows the tear strip 28 and the adjacent label material LM as having been torn away and as having removed a piece of the antenna 30, leaving a gap 32 in the antenna 30 and thereby destroying the transponder 27. Without a functioning antenna 30 the chip 29 cannot be written to or read.

Figure 9:
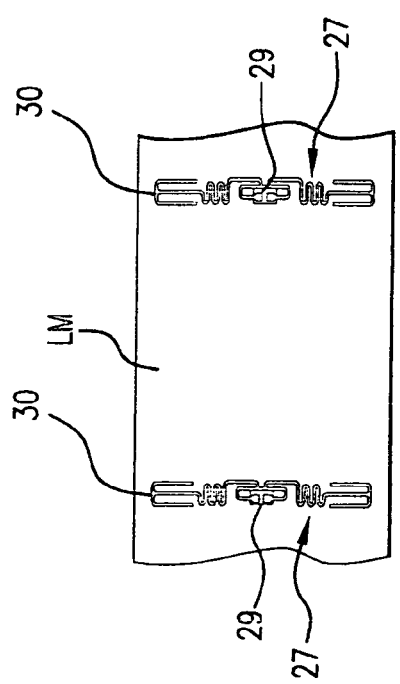
FIG. 9 is a top plan view of the web shown in FIG. 8 to which a coating of pressure sensitive adhesive, a tear strip and a release liner have been applied.
Figure 10:
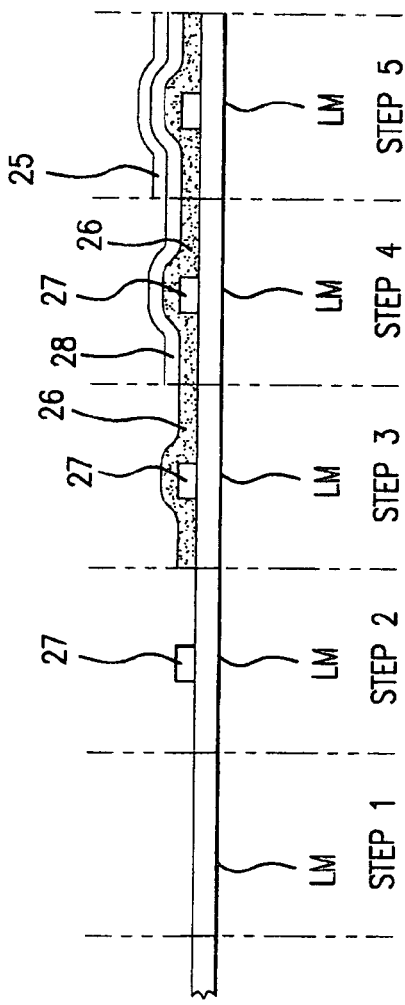
FIG. 10 is a diagrammatic progressive view showing steps of making the webs depicted for example in FIGS. 8 and 9.

FIG. 8 shows a longitudinally extending web of the label material LM onto which spaced transponders 27 have been placed or deposited such as by printing. FIG. 9 shows that a coating of pressure sensitive adhesive 26 has been applied to the underside of the web of label material LM and a web of a tear strip 28 is adhered to the adhesive 26 on the label material LM and to the adhesive 26 on the antenna 30 of the transponder 27. The liner or carrier web 25 has been applied over the adhesive 26, the transponder 27 and the tear strip 28 (FIG. 9). FIG. 10 shows the steps for making the composite web C. In STEP 1, a web of label material LM is provided. In STEP 2, transponders 27 (only one of which is shown at STEP 2) are applied to the web of label material LM at regularly or equally spaced apart intervals along the length of the web of label material LM. In STEP 3, a coating of the adhesive 26 is coated onto the web of label material LM and onto the transponders 27. In STEP 4, the tear strip web or tear strip 28 is applied to the adhesive-coated web of label material LM so that it crosses the transponder 27. In STEP 5, the release liner 25 is applied over the adhesive 26, the transponder 27 and the tear strip 28. FIG. 11 is a diagrammatic view showing the progression of: label material LM being paid out of a roll 33 and passing, for example, about a direction-changing roll 34. From there, transponders 27 are applied at equally spaced apart intervals to the label material LM. Next, a coating head 35 applies a coating of pressure sensitive adhesive 26 over the label material LM and the transponders 27. Next, the web of tear strip 28 is applied, and thereafter the carrier web 25 is applied over the adhesive 26, the transponder 27 and the tear strip 28. It is to be understood with respect to FIGS. 10 and 11 that the webs of label material LM, the tear strip 28, the liner 25 and the adhesive 26 are typically applied in production machines having stations for accomplishing the process and that these webs pass about various rolls as they travel from station-to-station. Also, these steps can be performed in different machines. When the labels L are cut, the tear strip web 28 is cut into definite lengths of tear strips 28 in FIG. 2, for example, coextensive in length with the length of the labels L. The tear strip 28 can, if desired, extend beyond the end of the label into the space between adjacent labels L.

FIGS. 1, 2 and 3 show spaced cuts 36 at the trailing position on the label L that straddle or are outboard of the tear strip 28 which assist in manually grasping the tear strip 28 to tear through the antenna 30. The cuts 36 preferably do not cut into the tear strip 28 because they are spaced from the tear strip 28. The transponders 27 are at the leading position near the leading end of the labels L.

As shown in FIG. 7, the labels L are supported on the carrier web 25 as the composite web C is advanced through a printer 37 in the forward direction F. The printer 37 can be any suitable printer, for example, a thermal printer having a thermal print head 38 which cooperates with a rotatable platen roll 39. Printers such as ink jet, laser, impact, flexographic and other types of printers can be used, if desired. In any event, the top or upper surface of the label L has a printable surface.

FIG. 12 shows an alternative form of composite web Ca wherein there is a cut 40 at the trailing end of the label L in the shape of a half moon. This cut 40 is through the label material LM and not through the tear strip 28 or the carrier web 25, and the cut 40 extends to the trailing marginal edge, but is spaced rearward of the transponder 27 (not shown in FIG. 12) which is at the leading position.

FIG. 13 shows a composite label web Cb wherein there is a single cut or line of weakening 41 to the trailing edge 40' of the label L which aids in locating the tear strip 28 and grasping the tear strip 28. The user can see the cut and thereby knows where the tear strip 28 is located. The transponder 27 (not shown in FIG. 13) is at the leading position. The telltale indicators I can take other forms such as printed text or graphics, an embossment, or notch, a symbol, a mark or the like.

FIG. 14 shows a fragmentary position of a label web 25 with labels Lc. The labels Lc have rearwardly extending tabs or extensions 60 which abut the leading edge 61 of the adjacent label Lc. The tear strip 28 is preferably slightly narrower than the tabs 60, and the tabs 60 overlie the tear strip 28, namely, the tear strip 28 is between the tabs 60 and the carrier web 25. The two cuts 62 that form the tabs 60 extend forward of the trailing edges 63 of the labels Lc to assist the start of the tearing of the label Lc when it has been applied to merchandise and it is desired to deactivate the label Lc. The tabs 60 preferably extend in the upstream or trailing direction, that is, opposite the forward direction F so that they do not cause tearing problems as the composite label web Cc progresses through the printer 37 in the feed or forward direction F.

Figure 15:
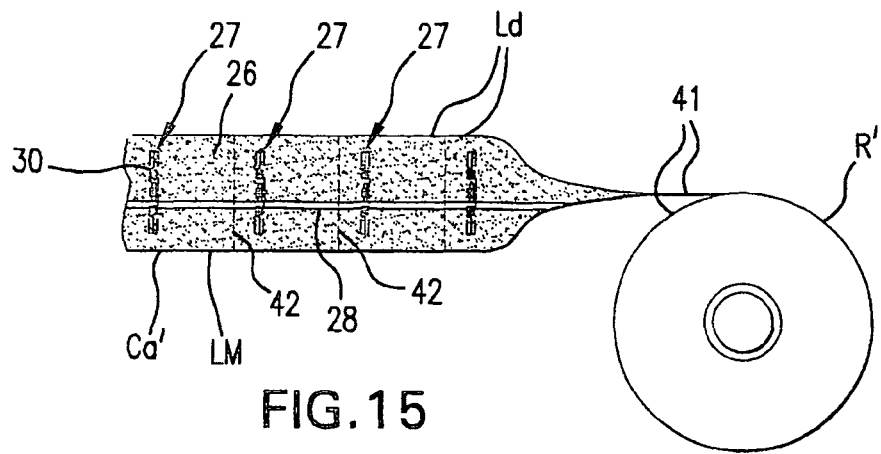
FIG. 15 is an elevational, partially rotated view of a linerless RFID transponder label web.

FIG. 15 shows a linerless web Ca' the same as composite web C, except instead of having a carrier web, the label material LM is coated with a suitable release coating 41 on its printable outer surface opposite the adhesive side of the web of label material LM. The web Ca' has label material LM which preferably has lines of weakening or partial severing 42 to facilitate tearing the labels L' apart from the remainder of the web Ca'. The release coating 41 enables the web Ca' to be wound upon itself into a roll R' and later unwound.

Figure 16:
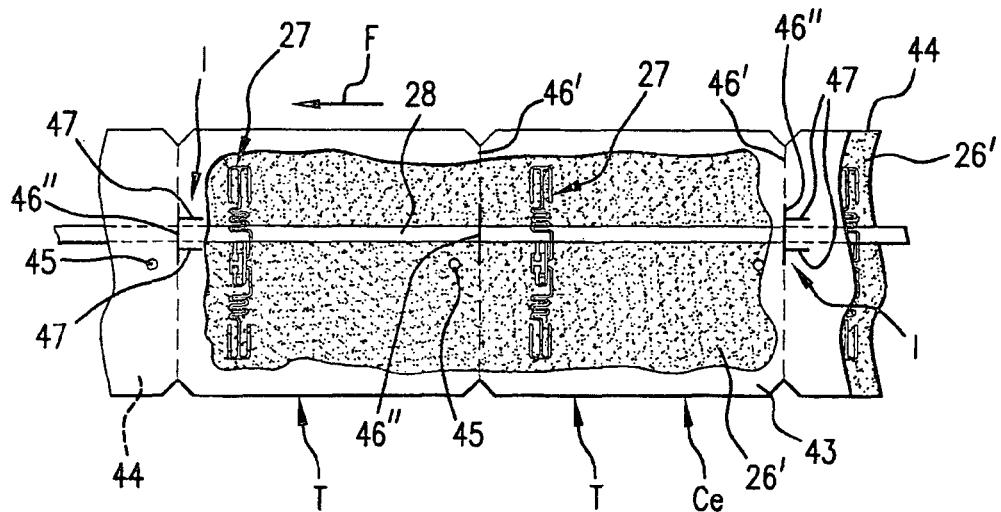
FIG. 16 is a top plan, partially broken away view of an RFID tag.
Figures 17, 18:
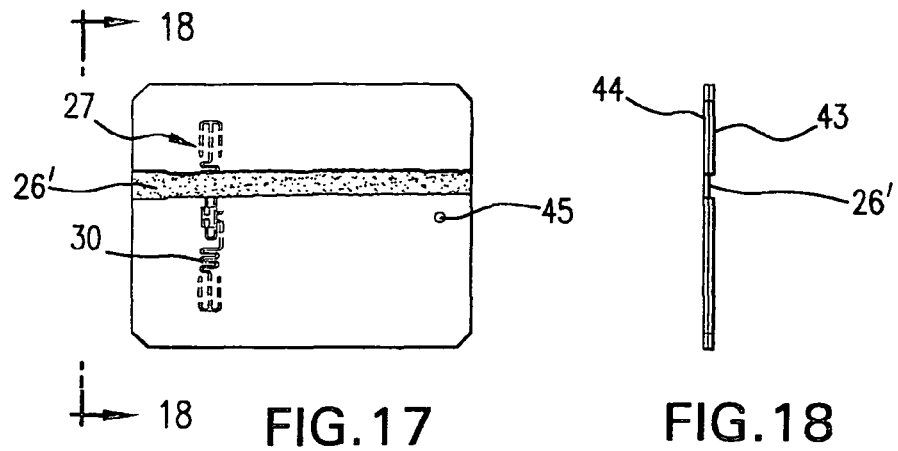
FIG. 17 is a top plan view of one of the tags shown in FIG. 16, with part of the antenna of the RFID transponder having been stripped from the tag.
FIG. 18 is an end elevational view of the stripped tag shown taken along line 18-18 in FIG. 17.

FIG. 16 shows a pair of webs 43 and 44 of tag stock have been laminated to each other using adhesive 26' and cut into a tag web Ce. The term "tag stock" is not used in any limiting sense and may include paper and/or film or other materials which can be torn to deactivate the RFID transponder 27. Before the webs 43 and 44 are laminated to each other, transponders 27 are positioned on one of the webs 43 or 44 and a tear strip 28 is placed so as to cross the transponder 27 and, preferably to cross the antenna 30. The tear strip 28 and the transponder 27 are sandwiched between the webs 43 and 44. The tag web Ce is also provided with attacher holes 45 by which a tag T can be hung using a plastic fastener from a host product such as a garment. The tag web Ce is also provided with transverse lines of weakening or partial severing 46' at which the tags T are connected, but enable the tags T to be torn from the web Ce when desired. The lines of partial severing 46' include cuts 46" preferably through at least one web 43 or 44, and through the tear strip 28. The tag web Ce also has through cuts 47 or other weakening which enable the tear strip 28 to be more easily grasped when attempting to deactivate a tag T.

The cuts or weakening 36, 40, 41, 47, 48', 49' and 60 are visually discernable and serve as markers or telltale indicators I as to where tearing should start so that the tear strip 28 tears through the transponder 27 to tear off a piece of the transponder 27 to deactivate it.

As shown in FIG. 16, the transponder 27 is between the tear strip 28 and the web 43, and the telltale indicators I are only on the web 43. If the telltale indicators were in the web 44, using the tear strip 28 to tear through the web 44 would not tear through the transponder 27.

Figure 19:
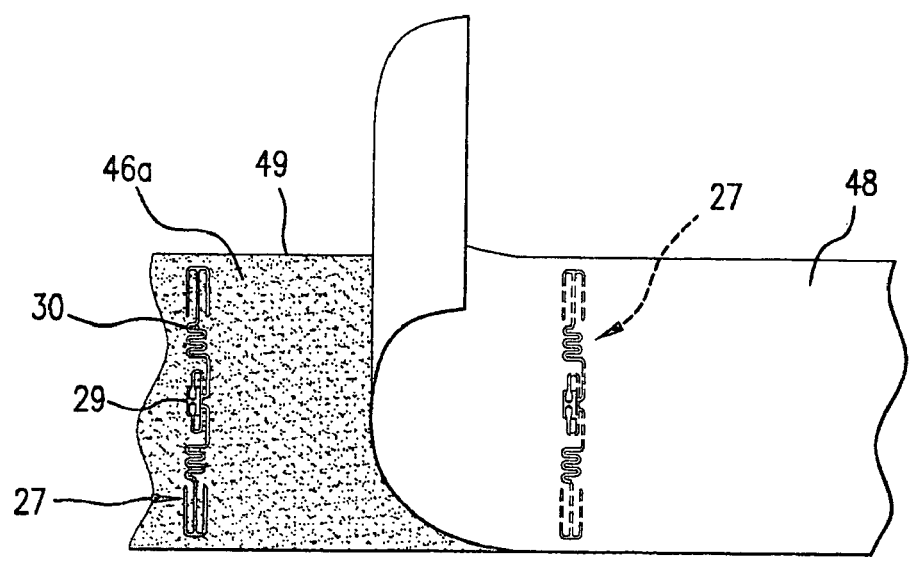
FIG. 19 is a top plan view of a partially formed RFID tag web.
Figure 20:
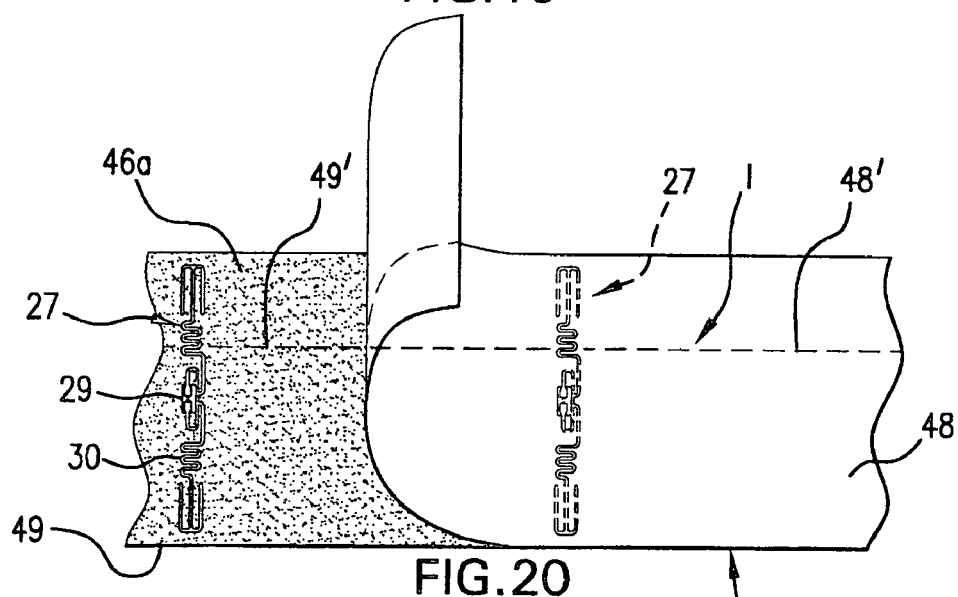
FIG. 20 is a top plan view similar to FIG. 18, but showing a further developed RFID tag web.
Figure 21:
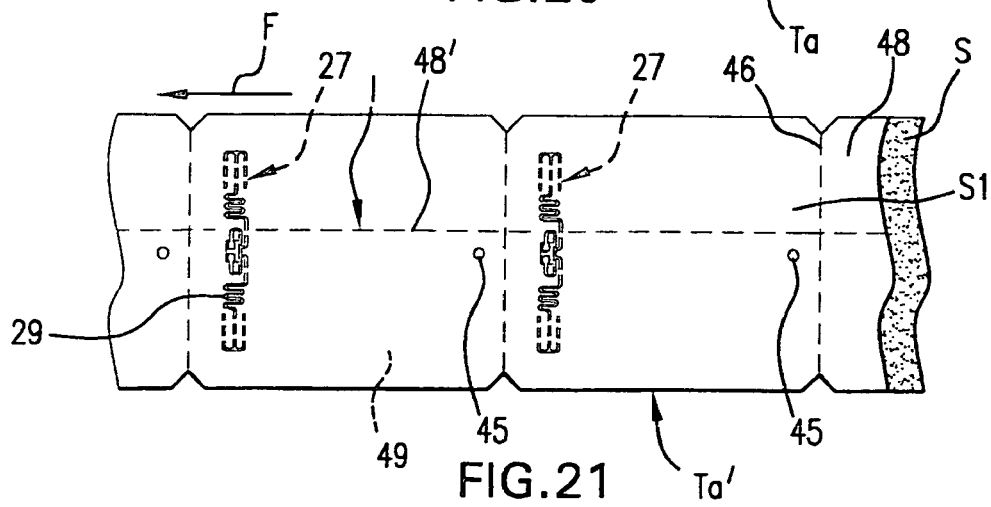
FIG. 21 is a top plan view of the completed web of deactivatable RFID tags also shown in FIGS. 19 and 20.

FIG. 19 shows a partially formed deactivatable tag web Ta including webs 48 and 49 of tag stock. Transponders 27 are applied to one of the webs at equally longitudinally spaced intervals, namely, to the web 49 and a suitable adhesive 46a or another suitable material is coated onto the web 49 and the transponder 27. After the webs 48 and 49 are preferably permanently laminated to each other, at least one and preferably both webs 48 and 49 are provided with lines or weakening or partial severing 48' and/or 49'. The partial severing 48' and/or 49' crosses the antenna 30 without cutting into or through the antenna 30. The partial severing 48' and/or 49' can, for example, be scoring that penetrates the webs 48 and 49, or if cuts go through the webs 48 and/or 49 the cuts can be interrupted short of the transponders 27 as shown so as not to damage the transponders 27 or render them inoperable. After a tag Ta' is separated from the tag web Ta, and used for its desired purpose, the tag Ta' can be deactivated by tearing along the line(s) 48' and 49', thereby severing the antenna 27. Each tag Ta' is comprised of two sheets S and S1.

The terms partial severing or weakening as used herein can, for example comprise perforating, scoring, creasing or embossing.

Various types of RFID transponders on the market are usable with the labels and tags of the invention. By way of example, not limitation, the RFID transponder 27 illustrated in the drawings is an RFID transponder with a so-called squiggle-type antenna sold by Alien Technology Corporation of 8220 Butterfield Blvd., Morgan Hill, Calif., U.S.A.

Other embodiments and modifications of the invention will suggest themselves to those skilled in the art, and all such of these as come within the spirit of this invention are included within its scope as best defined by the appended claims.

I claim:

1. Method of making a web of deactivatable RFID tags, comprising:
    providing a longitudinally extending first web of tag stock,
    applying RFID transponders at spaced apart locations on the web,
    applying a tear strip web across all the transponders, and
    thereafter laminating a second web of tag stock the first web with the transponders and the tear strip web sandwiched between the first and second webs to provide a web of tags,
    wherein each tag includes a tear strip formed from a portion of the tear strip web and at least one of the RFID transponders, said tear strip being selectively torn from the tag and thereby physically tearing the RFID transponder included in the tag to deactivate the RFID transponder.

2. Method as defined in claim 1, including
    providing telltale indicators for the tags on one side of the tags so that when the tear strip is used, the tear strip will tear through the transponder.

3. Method as defined in claim 1, including:
    at least partially severing the tear strip between adjacent transponders to define tags so that when the tear strip is in use the tear strip will tear through the transponder.

4. A web of deactivatable RFID tags, comprising:
    a layer of tag stock formed into a plurality of individual tags,
    a web of tag stock to which the tags are laminated,
    a plurality of spaced apart RFID transponders sandwiched between the layer of tag stock and the web of tag stock, said RFID transponders being spaced apart from one another such that each individual tag includes at least one RFID transponder, and
    a plurality of tear strips formed from a tear strip web crossing all the transponders, each individual tag including at least one tear strip, said tear strip being selectively torn from the tag and thereby physically tearing the RFID transponder included in the tag to deactivate the RFID transponder.

5. The web of claim 4, further comprising:
    a layer of pressure sensitive adhesive that removably adheres the tags to the web of tag stock.

6. The web of claim 4, wherein the web of tag stock comprises a release liner to which the tags are removably adhered.

* * * * *